(12) United States Patent
Gao et al.

(10) Patent No.: US 8,978,011 B2
(45) Date of Patent: Mar. 10, 2015

(54) MANAGING TEST RESULTS IN A DATA CENTER

(75) Inventors: Jingrong Gao, Richmond Hill (CA); Jianfeng Kong, Richmond Hill (CA); Michael George Polan, Markham (CA); Alex Kwok Kee Tsui, Markham (CA)

(73) Assignee: International Business Machines Corporation, Armonk, NY (US)

( * ) Notice: Subject to any disclaimer, the term of this patent is extended or adjusted under 35 U.S.C. 154(b) by 2654 days.

(21) Appl. No.: 11/124,692

(22) Filed: May 9, 2005

(65) Prior Publication Data

US 2006/0253588 A1 Nov. 9, 2006

(51) Int. Cl.
*G06F 9/44* (2006.01)
*G06F 11/36* (2006.01)

(52) U.S. Cl.
CPC .................................. *G06F 11/3688* (2013.01)
USPC ......................................................... 717/124

(58) Field of Classification Search
None
See application file for complete search history.

(56) References Cited

U.S. PATENT DOCUMENTS

| | | | | |
|---|---|---|---|---|
| 5,745,767 | A * | 4/1998 | Rosen et al. | 717/124 |
| 6,014,760 | A * | 1/2000 | Silva et al. | 714/46 |
| 6,381,604 | B1 | 4/2002 | Caughran et al. | 707/10 |
| 6,442,714 | B1 * | 8/2002 | Griffin et al. | 714/46 |
| 6,779,134 | B1 * | 8/2004 | Laviolette et al. | 714/38 |
| 6,889,158 | B2 * | 5/2005 | Penov et al. | 702/119 |
| 6,988,139 | B1 * | 1/2006 | Jervis et al. | 709/226 |
| 7,003,482 | B1 * | 2/2006 | Margoscin et al. | 705/35 |
| 7,143,361 | B2 * | 11/2006 | Ramchandani | 715/763 |
| 7,159,021 | B2 * | 1/2007 | Boldman et al. | 709/223 |
| 7,475,289 | B2 * | 1/2009 | Rosaria et al. | 714/38 |
| 7,721,289 | B2 * | 5/2010 | Remany et al. | 718/104 |
| 2001/0012986 | A1 * | 8/2001 | Conan et al. | 702/188 |
| 2002/0138226 | A1 * | 9/2002 | Doane | 702/119 |
| 2003/0074423 | A1 | 4/2003 | Mayberry et al. | 709/219 |
| 2003/0074606 | A1 * | 4/2003 | Boker | 714/42 |
| 2003/0121025 | A1 * | 6/2003 | Farchi et al. | 717/124 |
| 2003/0229884 | A1 | 12/2003 | Carr et al. | 717/101 |
| 2004/0103413 | A1 * | 5/2004 | Mandava et al. | 718/100 |

(Continued)

FOREIGN PATENT DOCUMENTS

| | | | | |
|---|---|---|---|---|
| EP | 1 447 759 A1 | 8/2004 | ............. | G06F 17/50 |
| WO | WO 03/001376 A1 | 1/2003 | ............. | G06F 9/455 |

OTHER PUBLICATIONS

U.S. Appl. No. 10/690,756, Acharya, Method, System and Program for Analyzing a Scalability of an Application Server, filed Oct. 22, 2003.

(Continued)

*Primary Examiner* — Jue Louie
(74) *Attorney, Agent, or Firm* — Yee & Associates, P.C.; Jeffrey S. LaBaw

(57) ABSTRACT

There is provided in an embodiment of the present invention a method wherein a processor may receive a test configuration deployment plan (TCDP) template. A user may select the test configuration deployment plan template and provide time schedule, and specific software application names and version numbers as settings for variables within the test configuration deployment plan template, in effect making a subscription request, wherein the processor receives or otherwise prompts to receive such information. Provided such resources are available at the requested time, the processor may wait until that time and provision the test configuration deployment plan to a data center resource. Test cases are run and results are collected until time or test cases are exhausted. The processor may then release resources that had been allocated to the subscription, which may include a step of undeploying or unprovisioning.

11 Claims, 3 Drawing Sheets

(56) References Cited

U.S. PATENT DOCUMENTS

2005/0096861 A1* 5/2005 Ur et al. .................. 702/109
2006/0168467 A1* 7/2006 Couturier et al. ............ 714/4
2007/0168970 A1* 7/2007 Li et al. .................... 717/124

OTHER PUBLICATIONS

Gao et al., Method and Apparatus for Deploying and Instantiating Multiple Instances of Applications in Automated Data Centers Using Application Deployment Template, filed Apr. 28, 2005.

U.S. Appl. No. 10/870,223, Oprea et al., Method and System for Establishing a Server Template for an Application Deployment, filed Jun. 17, 2004.

U.S. Appl. No. 10/870,227, Oprea et al., Method and System for Establishing a Deployment Plan for an Application, filed Jun. 17, 2004.

U.S. Appl. No. 10/870,228, Oprea et al., Method and System for Managing Application Deployment, filed Jun. 17, 2004.

* cited by examiner

*FIG. 4A*

```xml
<?xml version="1.0" encoding="UTF-8"?>
<deployment-plan-template>
    <routers>
        <router id="router-2229" dcm-router-id="1299" dcm-router-name="Alteon 184-01">
        ...
        </router>
    </routers>
    <subnets>
        <subnet id="subnet-2226" dcm-subnet-netaddress="?" dcm-subnet-netmask="?"
vlan-id="vlan-2225"
admin="false" vlan-no="49">
            <ip id="ip-2230" defined-on="router" defined-on-id="router-2229" address="?" />
        </subnet>
        <subnet id="subnet-2228" dcm-subnet-netaddress="?" dcm-subnet-netmask="?"
vlan-id="vlan-2227"
admin="false" vlan-no="50">...
    </subnets>
    <vlans>
        <vlan id="vlan-2225" vlan-no="49" />...
    </vlans>
    <clusters>
        <cluster name="TPM-test-server" min-size="1" max-size="1" device-model=
"single-server-cluster"
managed="true" tier="1" pool-type="existing" pool="1327">
            <logical-clusters>...
            </logical-clusters>
            <server-template name="ST-standalone_server">
                <routes>
                    <route realized-through="infoSet-2260" gateway-ip="ip-2231"
                    dest-subnet="subnet-2226" />
                </routes>
                <configured-nics>
                    <nic vlan-id="vlan-2227" dcm-nic-id="?" vlan-no="50">...
                    </nic>
                </configured-nics>                   411
                <hosting-stack>                      /
                <module name="OS" software-module-id="1181" sofware-name="?"
software-product-id="?" />
                    <module name="Database" software-module-id="1185" software-name="?"
                    software-product-id="?" />
                    <module name="WebSphere" software-module-id="1187" software-name="?"
                    software-product-
id="?" />
                    <module name="TPM-Build" software-module-id="1189" sofware-name=
                    "TPM-Build" software-
product-id="?" />
```

401 — routers block
403 — subnets block
405 — vlans block
407 — clusters block

TO FIG. 4B

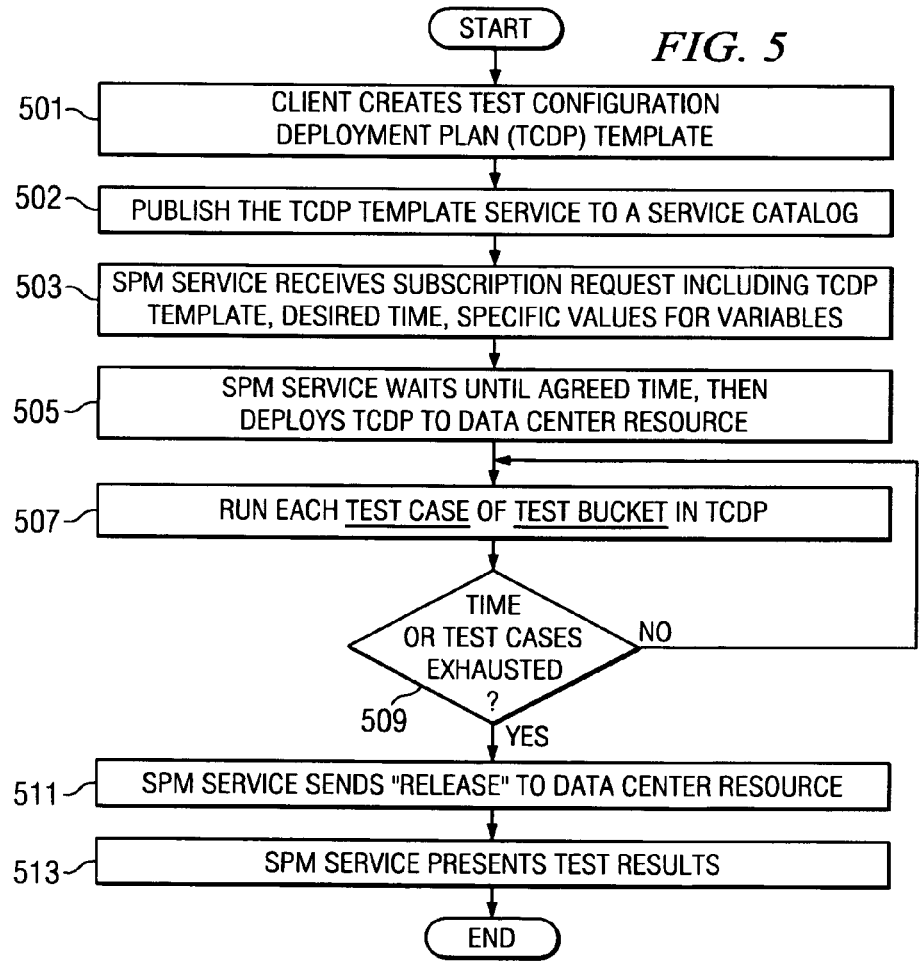

MANAGING TEST RESULTS IN A DATA CENTER

CROSS REFERENCE TO RELATED PATENT APPLICATIONS

The present application is related to co-pending applications "Method And System For Establishing A Deployment Plan For An Application", Ser. No. 10/870,227, and "Method And System For Establishing A Server Template For An Application" Ser. No. 10/870,223, which are assigned to the same assignee and incorporated herein by reference.

BACKGROUND OF THE INVENTION

1. Technical Field

The present invention relates to the field of testing software applied to hardware, and more specifically to a method and apparatus for provisioning and scheduling resources for testing in a data center resource.

2. Description of Related Art

Commercial software development typically undergoes a process having phases that include an establish requirements phase, a high-level design phase, a code phase, a document phase, a unit test phase, and debug phase. The debug phase may include performing iterations of coding, unit testing and integration testing in a process known as debugging. Often, a division of labor is present among employees and contractors of commercial software producers, which permit aspects of each phase to be performed in parallel. Examples of these aspects include the planning of each phase, wherein managers may plan, for example, the code phase simultaneously with planning of the unit test phase. Nevertheless, the actual execution of each phase tends to be linear.

As a development project progresses, greater amounts of labor and capital are invested in the unreleased software without any payment for orders being made. Any delays in phases prior to the unit test phase tend to place pressure on the unit test phase phase. This situation may lead to inadequate testing or delays in making a generally available release. Integration testing tends to be labor intensive because testers verify operation of the software in varying hardware environments and verify bug fixes that are, indeed, fixes. Because integration testing is a part of debugging, testers may test and retest the same component or set of codes as new revisions to the code are available. The ability to eliminate steps and simplify the execution of tests is highly beneficial.

Some strides have been made to automate testing steps. For example, test managers have developed workflows, which permit automated installation of both applications and operating systems onto varying hardware configurations. These workflows include, for example, scripts to identify hardware, allocate hardware, and configure hardware with installed software and data.

Test managers deliver testbuckets or test suites, when they engage in test planning. Testbuckets are a collection of test cases that testers run to verify the expectations of a software version's performance. Such testbucket running may assure that under the most frequent conditions expected to occur in the field, the software version is reliable. Often, such tests may automate or simulate inputs that could be expected to come from humans. Some examples of inputs include mouse movements, key-strokes, telemetry, streaming data, and aggregations of such data. When run, a testbucket collects output in one or more files known as test results. Test results can be voluminous. Results are often very repetitive, and long intervals can occur between results that are considered interesting. Interesting results are those that show a flaw in the code under test.

Commercial software development, even for personal computers, account for interdependencies between code and hardware of several different manufacturers. Often, varying drivers are present that are available from manufacturers of monitors and printers. New software often is required to operate with the varying device drivers. Each of these device drivers may have dozens of potential versions that may be encountered in field use of the code under test.

Thus, it would be advantageous to shift the labor involved in executing tests over to a planning stage such that the iterative executing of tests does not inflate a release schedule, while providing for broad test coverage. In other words, it would be advantageous to define as much of the physical configuration of available resources before execution of the actual tests, and assure that such a definition is so rigorous that a machine may perform the steps of provisioning the system-under-test.

SUMMARY OF THE INVENTION

Embodiments of the present invention provide a method, apparatus, and computer usable code instructions for producing test results in a data center resource. A subscription request is received in which the subscription request having a deployment template, a testbucket having a test case, and at least one variable setting. At least two resources are provisioned for the data center resource based on the subscription request. At least one test case is executed using resources. The resources are released after executing the test cases.

BRIEF DESCRIPTION OF THE DRAWINGS

The novel features believed characteristic of the embodiments of the present invention are set forth in the appended claims. The embodiments of the invention itself, however, as well as a preferred mode of use, further objectives and advantages thereof, will best be understood by reference to the following detailed description of an illustrative embodiment when read in conjunction with the accompanying drawings, wherein:

FIG. 4 shows excerpts from a test configuration deployment plan template that may operate as a reference for an embodiment to select resources applicable to a testbucket; and FIG. 5 shows a flowchart of an embodiment of the present invention.

DETAILED DESCRIPTION OF THE PREFERRED EMBODIMENT

Figure 1:
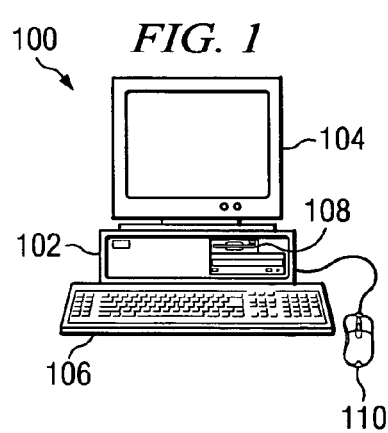
FIG. 1 shows a computer processor of the present invention in block form in accordance with an embodiment of the present invention.

With reference now to the figures and in particular with reference to FIG. 1, a pictorial representation of a data processing system in which the aspects of an illustrative embodiment of the present invention may be implemented. Computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer™ computer or IntelliStation™ computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
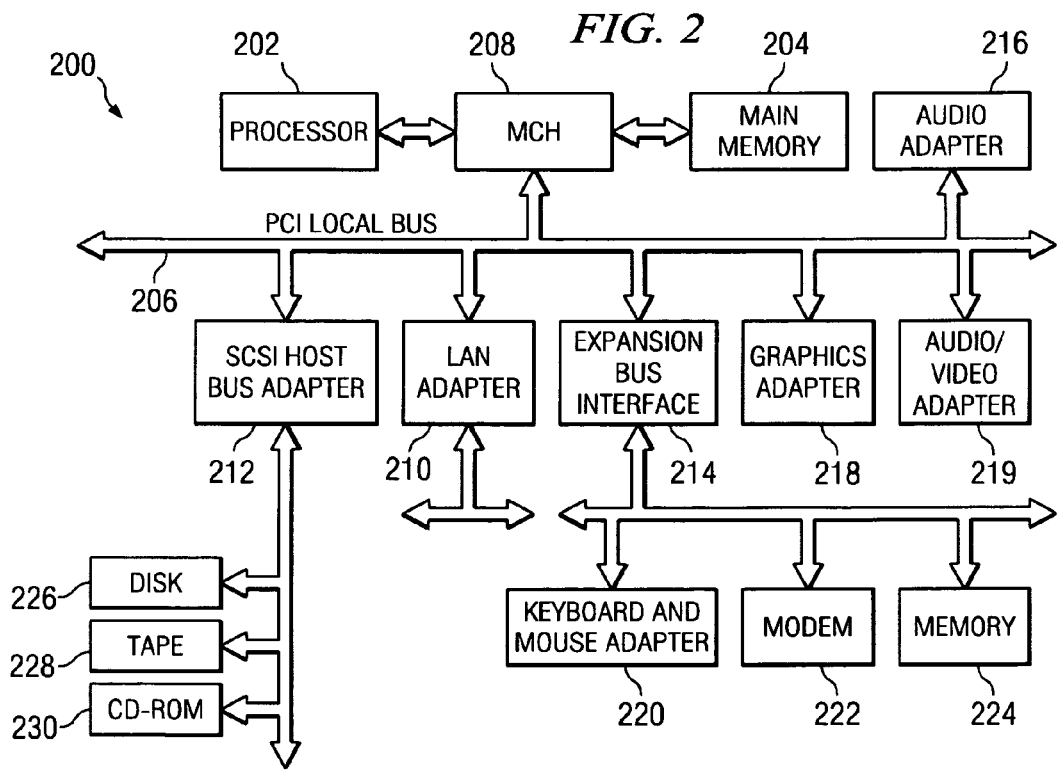
FIG. 2 shows a computer processor of the present invention in block form in accordance with an embodiment of the present invention.

With reference now to FIG. 2, a block diagram of a data processing system is shown in which aspects of the present invention may be implemented. Data processing system 200 is an example of a computer, such as computer 100 in FIG. 1, in which code or instructions implementing the processes of an embodiment of the present invention may be located. In the depicted example, data processing system 200 employs a hub architecture including a north bridge and memory controller hub (MCH) 208 and a south bridge and input/output (I/O) controller hub (ICH) 210. Processor 202, main memory 204, and graphics processor 218 are connected to memory controller hub 208. Graphics processor 218 may be connected to the memory controller hub through an accelerated graphics port (AGP), for example.

In the depicted example, local area network (LAN) adapter 212, audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to I/O controller hub 210. PCI/PCIe devices may include, for example, Ethernet adapters, add-in cards, PC cards for notebook computers, etc. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be connected to I/O controller hub 210.

An operating system runs on processor 202 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

Instructions for the operating system, the object-oriented programming system, and applications or programs are located on storage devices, such as hard disk drive 226, and may be loaded into main memory 204 for execution by processor 202. The processes of the present invention are performed by processor 202 using computer implemented instructions, which may be located in a memory such as, for example, main memory 204, read only memory 224, or in one or more peripheral devices.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

As some illustrative examples, data processing system 200 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 204 or a cache such as found in memory controller hub 208. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Provisioning as used herein is an act to configure or allocate resources. The act of provisioning may involve a service. The act of provisioning in these examples is the act of taking a request for a service perhaps with attendant time and quality parameters and performing one or more actions. These actions include, in these examples, one or more of the following:

1) selecting resources from a pool to obtain one or more allocated resources;

2) specifying interconnect parameters to one or more of the resources;

3) providing, if necessary, a way to authenticate among the allocated resources, and the origin of the service request; and 4) generally, all steps up to, but not including, the actual use of such resources to deliver a requested service.

At a more simple level, provisioning may merely define a network address between computers wherein such a network address is recorded in at least one of the computers. Thus, the resources comprised of the two computers are provisioned by an interaction or communication with one of the two computers.

Conversely, the act of unprovisioning is the act of deleting, purging, or even expiring the information or methods enumerated above. The word 'release' is synonymous with unprovision.

Figure 3:
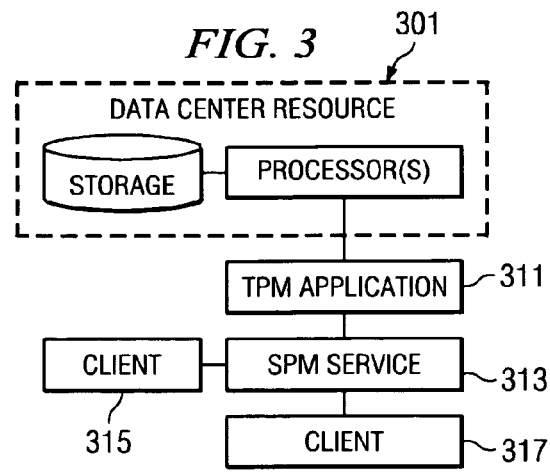
FIG. 3 shows a block diagram in accordance with an embodiment of the present invention.

FIG. 3 shows a block diagram of an illustrative embodiment of the invention interacting with data center resource 301. In this example, data center resource 301 is a combination of distributed physical computing environment, as well as, software and data components, and often multiples of each class of resource, for example, routers, switches, servers, software stacks, test drivers, and the like. Some steps of the embodiment may operate within service provisioning management (SPM) service 313. Service provisioning management 313 may occasionally interact with clients, which may be computer client 315 operated by a test manager member of a test team, or perhaps computer client 317 by a tester member who is responsible to get tests done. In general, it may be the test manager's job to create a deployment plan template, and the tester's job to order the test services for running their test cases, that is the testers are a kind of consumer of the deployment plan template. Service provisioning management service 313 may, from time to time, make requests or other communications to data center resource 301. IBM™ Tivoli® provisioning manager (TPM) application 311 may route, or more specifically execute the commands of Service provisioning management service 313. Service provisioning management service 313 and Tivoli provisioning manager application 311 may operate on individual processors of FIG. 2, or alternatively, operate on a common processor of FIG. 2. As such, a network interconnect between Service provisioning management service 313 and Tivoli provisioning manager application 311 may be unnecessary.

Tivoli provisioning manager application 311 automates manual tasks of provisioning and configuring servers, operating systems, middleware, applications, and network automation. In essence, Tivoli provisioning manager provides for the automated repurposing of a pool of servers and the resources that are tied to such servers.

A testbucket is a data structure that contains several test cases that relate to the same subject. A testbucket may include a reference to a file location in which test results may be placed. Initially such a file location may be empty. In the illustrative examples, each test case may be a script, dependent on certain variables being specified, that can be executed to collect both expected results and failed results concerning a simple feature of the software under test.

In these examples, a test configuration is resource assembly that connects its parts to each other to achieve the goals of a test plan. The assembly is more than a list of the resources in the illustrative examples. For example, the assembly may show network topology for a distributed computing environment. The assembly may show specific software applications that run on specific computers, and often adopts naming conventions so that computers, networks and other entities may be identified by mnemonic names. Part or all of a test configuration may be described in an extensible markup language (XML) file in these examples.

In some contexts a "test configuration" is the description of the resources and the connection between the resources. In other contexts, the "test configuration" is an actual operating assembly of resources. A "test configuration" is complete in that it requires no additional connectivity information in order to fulfill a test plan. The only exception to this rule is that connectivity information flows in the addresses of many packets sent and acknowledged during ordinary standard packet switched communication.

In these examples, a test configuration involves both the quantity of various resources as well as the quality of each resource. Each resource and its quantity, may be specified by storing the specific value in each case to a variable, wherein the variable is associated with a test configuration deployment plan, and includes, among other things, driver numbers, software versions and platforms. A test configuration deployment plan is a plan that details the hardware, software, and connectivity necessary to establish resources needed to reach the objective of the plan. This plan shows all of the components needed to establish the resources to meet the objective. Further details concerning the test configuration deployment plan are described below with respect to FIG. 4.

In this illustrative example, the principal job of Tivoli provisioning manager application 311 is to accept commands guided by variables that define the configuration and rapidly assemble the resources into a collective whole to test each test case in the testbucket. Tivoli provisioning manager application 311 is used in these examples to illustrate one particular provisioning manager application that may be utilized. Of course other provisioning applications may be used depending on the particular implementation. The Tivoli provisioning manager application 311 may invoke workflows, and may, in turn, be commanded during the execution of a workflow to take steps to provision one or more resources. Any type of provisioning management application may be used in place of the Tivoli provisioning manager application 311.

One or more illustrative embodiments of the present invention may store test results in a place or location designated or referenced by a subscription. A subscription request, once accepted, may initiate tests, and thus storage of test results. The place or location designated may be established at the time a subscription is established by the tester—and yet empty until actual test cases are executed. A subscription is the result of a dialog between a user and the service provisioning management service 313 where the inputs from the user are error-checked and validated to be free of conflicts in a process known as accepting the subscription.

Data center resource 301 is typically a pool of computers, including at least one computer 200 of FIG. 2, network interconnects, data, and software. Often the data center resource is under a common control that is responsive to rapidly configure multiple machines together or alternatively isolate machines to handle various sequenced and concurrent subscriptions. Frequently, computers, routing resources, storage, and the like are released from a current assignment and made available for reassignment to another subscription. As such, these resources, including available software applications or installable code are included among a pool of available resources.

FIG. 4 is a diagram of an exemplary deployment template, which may be an extensible markup language (XML) file, in accordance with an embodiment of the present invention. In these examples, such a deployment template may be created to associate variables to a general test configuration. The association provides for an easy way to later collect and resolve the variables to produce a list of resources and a topology interconnecting them.

Deployment template is also referred to as a test configuration deployment plan template. In the planning stages, a tester, who could be a test manager, may create the deployment template. The deployment plan template defines the set up of router 401, subnetworks 403, virtual local area networks 405, and cluster configurations 407. The deployment plan template may leave some variables or parameters open for later resolution. The variables may include net-addresses, net-masks, internet protocol addresses, media access control identifiers, among others. The question marks, "?", within the deployment plan template are the deployment parameters relating to tests and timing 409 and deployment parameters relating to resources 411 that a user or tester may resolve when the final deployment plan is generated. Such resources may include, for example, an operating system and a persistent storage. Persistent storage may include a file system or a database application software.

FIG. 5 is a flowchart of a process for assembling networked resources into a test configuration, executing tests, and disbanding the test configuration operated by the service provisioning management service in accordance with an embodiment of the present invention. The deployment template may be imported into the Tivoli provisioning manager application, wherein service provisioning management service 313 may host a data entry page that shows the name of the deployment template among services offered in a service catalog. The data entry page may be, for example, a web page.

A service catalog may be represented as list of options presented, for example by a graphical user interface. The graphical user interface may take a user selected option from among the listed items, and look up a corresponding form for user input. The corresponding form may provide a mechanism for a user to specify a reservation of data center physical resources which includes, among other things, a scheduled time to use the system resources, and parameters that denote the scale of the processing the user requires.

The process begins with a user or client creating a test configuration deployment plan template (step 501). A user may create a test configuration plan template by using text editors or other entry tools. Creation of the deployment template may be so detailed as to include configuration variables. Configuration variables determine the available configurations of the test case. For example, a configuration variable may be the "platform" variable. Such a variable may be set to a specific instance with such strings as "Intel", "Linux" or "Solaris" to identify the underlying architecture of the test platform. Intel® is a trademark of Intel Corporation, Solaris® is a trademark of Sun Microsystems, Inc., and LINUX® is a registered trademark of Linus Torvalds.

The client may create a service provisioning management service based on the deployment plan template and publish the service to a service catalog (step 502). For example, Tivoli provisioning manager may facilitate this step by providing a web based graphical user interface (GUI) to create a service provisioning management service. A test member is a type of user who performs some of the detail work concerning testing. A test member may have some duties in common with a test manager. In the GUI, a test member may input the name for the service and upload the deployment template (step 502). Logical deployment information such as cluster information, internet protocol address, and virtual local area network information may be defined in the deployment template. Variables such as driver numbers and software versions may be used to complete the deployment plan. Such variables may serve as the basis for a form presentation to a user for data entry.

Given that the deployment template is accessible, a user or tester operating one of the clients of FIG. 2, may select the deployment template and respond to questions or other prompts provided, for example by a world wide web page from service provisioning management service 313. In these examples, the questions or prompts are used ask the user to provide user input to choose a testbucket and assign values to each variable of the deployment plan. When service provisioning management service 313 receives this user input, service provisioning management service 313 creates a test configuration deployment plan (TCDP). Service provisioning management service 313 may acquire tester input that specifies the scheduled times for the test. In addition, service provisioning management service 313 may elicit responses from the tester that resolve with specific instances, the variables defined in the deployment plan template.

The service provisioning management service 313 may create a test configuration deployment plan by stepping through each of the variables, denoted by "?" of FIG. 4. The service provisioning management service 313, may obtain content for each variable by asking an English question or otherwise prompting the user for input to a field. Validation limits may be established in a database that provides applicable tolerances and choice lists for each type of extensible markup language tag of the test configuration deployment plan template. Limits may be, for example, choices such as "DB2" or "Oracle" where a test configuration deployment plan template requires a database variable resolved.

A query that requests a specific known hardware to be available at a specific time can be validity checked at the time when a user enters the machine identity and time specification. Thus, even before a form is entirely complete, the service provisioning management service 313 may inform the user of unavailability.

At this point, service provisioning management service 313 receives a subscription request provided by the user (step 503). In these examples the subscription request includes a deployment template, a testbucket having a test case, and at least one variable setting. A user may cause this step to occur when, for example, the user selects a button to accept the currently entered form as the user's request. If a service catalog lists the service, a test member can find this service by browsing the service catalog and subscribing to this service. The test member may operate client 317 in FIG. 3, for example. During steps leading up to a subscription, the test member specifies the desired time and specific value for each variable. Such a request or subscription may be transmitted, for example by hypertext transfer protocol request and may include a deployment template, a testbucket, specific values for one or more variables, and any desired timing for the data center resource to be allocated to the subscription. Some subscription requests may conflict with available resources of the data center resource. In that case, multiple subscription requests are received (step 503) before advancing the user's attempt to have a testbucket executed. Once the user has supplied specific values for the variables and the service provisioning manager has accepted the subscription, a test configuration deployment plan is established. A test configuration deployment plan is a test configuration deployment plan template that has each variable resolved and the service provisioning management service 313 has accepted the request.

Some conditions are usually met before the service provisioning manager accepts a subscription. Variables that are resolved by the test member should be correct and within tolerances of the expected values. In addition, though an answer to each variable is correct, the answers to several variables should not conflict. Still further, the data given to complete a subscription should not be in conflict with another subscription, as may occur when there is contention for the same resource or resources. Provided that these types of error checks are satisfied, service provisioning management service 313 may accept the request.

Service provisioning management service 313 may wait until the agreed time and deploy the test configuration deployment plan to the data center resource using workflows (step 505). The workflows are specified in the test configuration deployment plan to provision hardware and software resources from the pool of resources in the data center resource. With reference to the testbucket for the test configuration deployment plan, the service provisioning management runs each test case of the testbucket (step 507). This running of test cases continues until either the test cases or time of the subscription is exhausted (step 509). The test results are collected or stored by a data structure of the test configuration deployment plan and may be referenced based on a unique identifier that uniquely identifies the particular subscription of the user.

When an affirmative result to either the test cases or time of the subscription test (step 509) occurs, the service provisioning manager service may send a "release" message to the data center resource (step 511). The service provisioning manager service may store the test results in a file referenced by the subscription data structure. Such a release message may be coordinated through the Tivoli provisioning manager application. The data center resource may recognize the release message as a command to de-provision resources that had formerly been allocated to the subscription, thus returning such resources to the pool of available resources of the data center resource. The service provisioning manager service may present the test results referenced by the subscription data structure (step 513). Such a presentation may be to a client to which the tester is already logged into, or, alternatively, upon request, once the tester presents credentials.

Thus, the different aspects of the present invention provide a method, apparatus, and computer useable code for producing test results in a data center resource. A subscription request is received in which the subscription request in these examples has a deployment template, a testbucket having a test case, and at least one variable setting. At least two resources are provisioned for the data center resource based on the subscription request. At least one test case is executed using the at least two resources. The resources are released.

In this manner, testers and other users are permitted to specify, provision, and test for varying operating system and device driver environments, especially on a schedule. As a result, the embodiments of the present invention allow for shifting of the labor involved in executing tests over to a planning stage. Additionally, the embodiments of the present invention allow for performance of unattended execution and testing of code-under-test with results being collected with less user intervention or supervision.

The different aspects of the present invention may take the form of an entirely hardware embodiment, an entirely software embodiment or an embodiment containing both hardware and software elements. In an embodiment, the invention is implemented in software, which includes but is not limited to, firmware, resident software, microcode, etc. Steps performed may be either in series or simultaneously.

Furthermore, aspects of the present invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for producing test results in a data center resource, the method comprising:
receiving a subscription request for a service, the subscription request having a deployment template, a test case and at least one variable setting, wherein the at least one variable setting is a time schedule that specifies a future point in time as to when resources are to be provisioned;
provisioning at least two resources for the data center resource at the future point in time based on the subscription request and on the time schedule, wherein the at least two resources are selected from a pool of resources;
executing at least one test case using the at least two resources to produce at least one test result and storing the at least one test result having a unique identifier; and
releasing the at least two resources, wherein the deployment template comprises interconnect parameters that define an external network connection between the at least two resources selected from the pool of resources, wherein a certain one of the interconnect parameters is not specified in the deployment template when received in the subscription request but is instead subsequently resolved prior to the provisioning.

2. The method of claim 1, further comprising:
creating a service provisioning management service based on the deployment template; and
publishing the service provisioning management service to a service catalog.

3. The method of claim 1, wherein the subscription request is generated responsive to receiving user input at a graphical user interface (GUI), where such user input is error-checked and validated to be free of conflicts using validation limits maintained in a database that provide applicable tolerances and choices for the at least one variable setting.

4. A data processing system for producing test results in a data center resource, the data processing system comprising:
a bus;
a processing unit connected to the bus;
a communication unit connected to the bus;
a memory connected to the bus, wherein computer usable code is located in memory and wherein the processing unit executes the computer usable code to receive a subscription request for a service, the subscription request having a deployment template, a testbucket having a test case, and at least one variable setting, wherein the at least one variable setting is a time schedule that specifies a future point in time as to when resources are to be provisioned; provision at least two resources for the data center resource at the future point in time based on the subscription request and on the time schedule, wherein the at least two resources are selected from a pool of resources;
execute at least one test case using the at least two resources to produce at least one test result and storing the at least one test result having a unique identifier; and
release the at least two resources, wherein the deployment template comprises interconnect parameters that define an external network connection between the at least two resources selected from the pool of resources, wherein a certain one of the interconnect parameters is not specified in the deployment template when received in the subscription request but is instead subsequently resolved prior to the provisioning.

5. The data processing system of claim 4, wherein the processing unit executes the computer usable code to create a service provisioning management service based on the deployment template; and publish the service provisioning management service to a service catalog.

6. The data processing system of claim 4, wherein the subscription request is generated responsive to receiving user input at a graphical user interface (GUI), where such user input is error-checked and validated to be free of conflicts using validation limits maintained in a database that provide applicable tolerances and choices for the at least one variable setting.

7. A computer program product comprising a non-transitory computer usable medium having computer executable code embodied thereon for producing test results in a data center resource having at least two resources, said computer program product comprising:

computer usable program code to receive a subscription request for a service, the subscription request having a deployment template request, the subscription request having a deployment template, a test case, and at least one variable setting, wherein the at least one variable setting is a time schedule that specifies a future point in time as to when resources are to be provisioned;

computer usable program code to provision at least two resources for the data center resource at the future point in time based on the subscription request and on the time schedule, wherein the at least two resources are selected from a pool of resources;

computer usable program code to execute at least one test case using the at least two resources to produce at least one test result and storing the at least one test result having a unique identifier; and computer usable program code to release the at least two resources, wherein the deployment template comprises interconnect parameters that define an external network connection between the at least two resources selected from the pool of resources, wherein a certain one of the interconnect parameters is not specified in the deployment template when received in the subscription request but is instead subsequently resolved prior to the provisioning.

8. The computer program product of claim 7, further comprising:

computer usable code to create a service provisioning management service based on the deployment template; and computer usable code to publish the service provisioning management service to a service catalog.

9. The computer program product of claim 7, wherein the subscription request is generated responsive to receiving user input at a graphical user interface (GUI), where such user input is error-checked and validated to be free of conflicts using validation limits maintained in a database that provide applicable tolerances and choices for the at least one variable setting.

10. A method for producing test results in a data center resource, the method comprising:

creating, by a service provisioning manager application that is configured to generate service commands based on user-specified criteria, a service provisioning management service based on a deployment template;

publishing the service provisioning management service to a service catalog;

receiving a subscription request for a service by the service provisioning manager application, the subscription request having the deployment template, a test case and at least one variable setting, wherein the at least one variable setting is a time schedule that specifies a future point in time as to when resources are to be provisioned, wherein the subscription request is generated responsive to receiving user input at a graphical user interface (GUI), where such user input is error-checked and validated to be free of conflicts using validation limits maintained in a database that provide applicable tolerances and choices for the at least one variable setting;

provisioning, by a provisioning manager application that is configured to allocate resources from a pool of resources, at least two resources for the data center resource at the future point in time based on the subscription request and on the time schedule, wherein the at least two resources are selected from the pool of resources;

executing, by the service provisioning manager application, at least one workflow using the at least two resources to produce at least one test result and storing the at least one test result; and releasing the at least two resources, wherein the deployment template comprises interconnect parameters that define an external network connection between the at least two resources selected from the pool of resources.

11. The method of claim 10, wherein the provisioning manager application invokes the at least one workflow and is commanded during execution of the at least one workflow to provision the at least two resources.

* * * * *